United States Patent [19]

Kimura et al.

[11] Patent Number: 5,506,286

[45] Date of Patent: Apr. 9, 1996

[54] METHOD FOR STABILIZING AN ORGANIC MATERIAL USING A HINDERED PIPERIDINE COMPOUND

[75] Inventors: Kenji Kimura, Ibaraki; Motohiko Samizo, Osaka; Shinya Tanaka, Toyonaka; Yukihiro Honda, Ibaraki; Manji Sasaki, Nishinomiya; Shinichi Yachigo, Toyonaka, all of Japan

[73] Assignee: Sumitomo Chemical Company, Limited, Osaka, Japan

[21] Appl. No.: 305,365

[22] Filed: Sep. 13, 1994

Related U.S. Application Data

[62] Division of Ser. No. 56,880, May 5, 1993, Pat. No. 5,384,348.

[30] Foreign Application Priority Data

May 13, 1992 [JP] Japan ..................... 4-120430
Feb. 15, 1993 [JP] Japan ..................... 5-025416

[51] Int. Cl.$^6$ .................... C08K 5/3435; C09K 15/22
[52] U.S. Cl. .......................... 524/103; 252/403
[58] Field of Search .................. 524/103; 252/403

[56] References Cited

U.S. PATENT DOCUMENTS

| 4,153,596 | 5/1979 | Oertel et al. ............. 260/45.8 N |
| 4,468,488 | 8/1984 | Minagawa et al. .............. 524/102 |
| 4,665,185 | 5/1987 | Winter et al. .................. 546/184 |

FOREIGN PATENT DOCUMENTS 0034829 9/1981 European Pat. Off. .
0309402 3/1989 European Pat. Off. .
0319480 6/1989 European Pat. Off. .

OTHER PUBLICATIONS

Chemical Abstracts, vol. 118, No. 39632n, 1993.
Chemical Abstracts, vol. 115, No. 232088f, 1991.

*Primary Examiner*—Kriellion S. Morgan
*Attorney, Agent, or Firm*—Sughrue, Mion, Zinn, Macpeak & Seas

[57] ABSTRACT

A hindered piperidine compound represented by the formula of

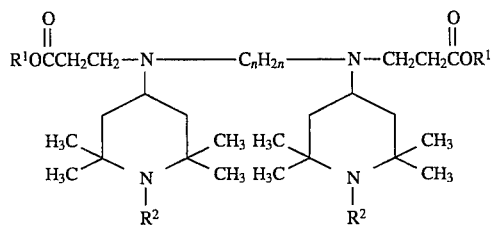

wherein $R^1$ is a 2,2,6,6-tetramethyl-4-piperidyl group of which the N-position is substituted or not, a hydrogen atom, a $C_1$–$C_{18}$ alkyl group which may contain a cyclic portion, or a $C_7$–$C_{18}$ arylalkyl group, $R^2$ is a hydrogen atom, a $C_1$–$C_{10}$ alkyl group which may contain a cyclic portion, a $C_1$–$C_{18}$ alkyloxy group which may contain a cyclic portion, or a hydroxyl group, and n is an integer of 2 to 8, effectively stabilizes organic materials having a property to deteriorate by the action of light. A method for producing the compound represented by the above formula is also disclosed.

34 Claims, No Drawings

METHOD FOR STABILIZING AN ORGANIC MATERIAL USING A HINDERED PIPERIDINE COMPOUND

This is a divisional of application No. 08/056,880 filed May 5, 1993 now U.S. Pat. No. 5,384,348, issued Jan. 24, 1995.

The present invention relates to the stabilization of organic materials by incorporating a particular hindered piperidine compound into the organic materials, novel hindered piperidine compounds and production of some of the compounds.

It is known that organic materials such as various synthetic resins, including polyethylene, polypropylene, polyvinyl chloride, polyurethane and ABS resins, natural or synthetic rubbers, paints and the like deteriorate by the action of light, and as a result that their physical properties show a large reduction accompanied by phenomena such as softening, embrittlement or discoloration. Because of this, various light stabilizers have so far been developed and used, but demands for novel and more superior light stabilizers are still strong even now. Particularly, developments of light stabilizer compounds having a hindered piperidine skeleton, i.e. a 2,2,6,6-tetramethyl-4-piperidyl group, are actively tried.

For example, EP-A-34829 discloses a compound having a 2,2,6,6-tetramethyl-4-aminopiperidine skeleton and besides forming a carboxylic acid salt, particularly a nickel salt at another site. However, the nickel salt shown here is green, and such coloration of the compound itself is a serious hindrance to use of the compound as a light stabilizer for organic materials.

Further, the above EP-A-34829 discloses a method for producing a lower alkyl ester of the piperidine compound before forming the salt by subjecting 4-alkylamino-2,2,6,6-tetramethylpiperidine or N,N'-bis( 2,2,6,6-tetramethyl-4-piperidyl)alkylenediamine to Michael reaction with an acrylic acid ester. This method, however, has a drawback that the yield of the desired compound lowers when the acrylic acid ester used has a sterically bulky substituent.

The present inventors have continued a study to develop a stabilizer exhibiting excellent stabilizing effect against the deterioration of organic materials by photo-oxidation, and as a result have found that a particular hindered piperidine compound has excellent effect. The present inventors thus attained to the present invention.

An object of the present invention is to provide a compound having such properties that it exhibits a high stabilizing effect against the deterioration of organic materials by photo-oxidation, and also it itself is white to colorless, giving no color to the organic materials to be stabilized when added thereto.

Another object of the present invention is to stabilize organic materials with such compound.

A further object of the present invention is to produce useful compounds among such compounds in good yields.

According to the present invention, there is provided a particular hindered piperidine compound used as a stabilizer for organic materials. This hindered piperidine compound is represented by the following formula (I):

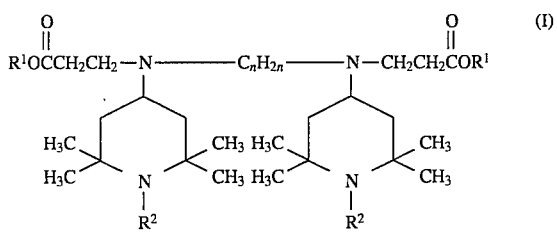

wherein $R^1$ is a 2,2,6,6-tetramethyl-4-piperidyl group of which the N-position is substituted or not, a hydrogen atom, a $C_1$–$C_{18}$ alkyl group which may contain a cyclic portion, or a $C_7$–$C_{18}$ arylalkyl group; $R^2$ is a hydrogen atom, a $C_1$–$C_{10}$ alkyl group which may contain a cyclic portion, a $C_1$–$C_{18}$ alkyloxy group which may contain a cyclic portion, or a hydroxyl group; and n is an integer of 2 to 8.

Thus, the present invention provides a method for stabilizing organic materials by blending them with a stabilizing amount of the hindered piperidine compound represented by the above formula (I), and also provides stabilized organic material compositions comprising the organic materials and the hindered piperidine compound represented by the above formula (I).

The compound of the formula (I) wherein $R^1$ is a 2,2,6,6-tetramethyl-4-piperidyl group of which the N-position is substituted or not, a $C_5$–$C_{18}$ alkyl group which may contain a cyclic portion or a $C_7$–$C_{18}$ arylalkyl group is a novel compound. Thus, the present invention further provides a hindered piperidine compound represented by the formula (I), wherein $R^1$ is a 2,2,6,6-tetramethyl-4-piperidyl group of which the N-position is substituted or not, a $C_5$–$C_{18}$ alkyl group which may contain a cyclic portion, or a $C_7$–$C_{18}$ arylalkyl group, and $R^2$ and n are as defined above.

Further, according to the present invention, there is provided a method for producing the hindered piperidine compound represented by the formula (I) by transesterification, in which formula $R^1$ is a 2,2,6,6-tetramethyl- 4-piperidyl group of which the N-position is substituted or not, a $C_3$–$C_{18}$ alkyl group which may contain a cyclic portion, or a $C_7$–$C_{18}$ arylalkyl group, and $R^2$ and n are as defined above.

In the aforementioned formula (I) representing the hindered piperidine compound which is the stabilizer component of the present invention, $R^1$ is a 2,2,6,6-tetramethyl-4-piperidyl group of which the N-position is substituted or not, a hydrogen atom, a $C_1$–$C_{18}$ alkyl group which may contain a cyclic portion, or a $C_7$–$C_{18}$ arylalkyl group. When $R^1$ is a 2,2,6,6-tetramethyl-4-piperidyl group, a substituent bonded to the N-position includes $C_1$–$C_{10}$ alkyl groups which may contain a cyclic portion, $C_1$–$C_{18}$ alkyloxy groups which may contain a cyclic portion, and a hydroxyl group. The 2,2,6,6-tetramethyl-4-piperidyl group, therefore, is generally represented by the following formula (II),

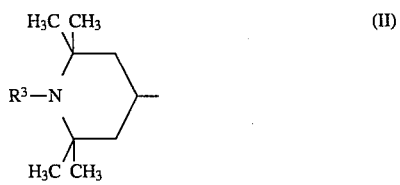

wherein $R^3$ is a hydrogen atom, a $C_1$–$C_{10}$ alkyl group which may contain a cyclic portion, a $C_1$–$C_{18}$ alkyloxy group which may contain a cyclic portion, or a hydroxyl group.

When $R^3$ in the formula (II) is an alkyl group having 3 or more carbon atoms, the alkyl group may be of either a straight-chain form or a branched form and also may contain a cyclic portion. A preferred alkyl group containing a cyclic portion and represented by $R^3$ includes those containing a cyclic alkyl group at the middle or terminal and bonding to the nitrogen atom through —$CH_2$—. Particularly preferred examples are a cyclohexylmethyl group and a cyclohexylethyl group. Similarly, when $R^3$ in the formula (II) is an alkyloxy group having 3 or more carbon atoms, the alkyl moiety of the group may be of either a straight-chain form or branched form and also may contain a cyclic portion. The alkyloxy group containing a cyclic portion and represented by $R^3$ may be a cyclic alkyloxy group such as cyclohexyloxy. Those which are particularly preferred as $R^3$ in the formula (II) include hydrogen, a $C_1$–$C_3$ alkyl, octyloxy, cyclohexyloxy and the like.

When $R^1$ in the formula (I) is an alkyl group, it includes, for example, methyl, ethyl, n-propyl, isopropyl, n-butyl, isobutyl, sec-butyl, tert-butyl, n-pentyl, n-hexyl, cyclohexyl, n-octyl, 2-ethylhexyl, n-decyl, n-dodecyl, n-octadecyl and the like. Among these alkyl groups, those having 3 or more carbon atoms may be of either a straight-chain form, branched form or cyclic form. When $R^1$ is an arylalkyl group, it includes, for example, benzyl, phenethyl and the like.

Among these $R^1$s, preferred ones include 2,2,6,6-tetramethyl- 4-piperidyl, 1,2,2,6,6-pentamethyl-4-piperidyl, 2,2,6,6-tetramethyl-1-octyloxy-4-piperidyl, 1-cyclohexyloxy-2,2,6,6-tetramethyl-4-piperidyl, 1-hydroxy-2,2,6,6-tetramethyl-4-piperidyl, hydrogen, methyl, ethyl, 2-ethylhexyl and the like.

The group $R^2$ in the formula (I) is a hydrogen atom, a $C_1$–$C_{10}$ alkyl group which may contain a cyclic portion, a $C_1$–$C_{18}$ alkyloxy group which may contain a cyclic portion, or a hydroxyl group. When $R^2$ is an alkyl group, it may be methyl, ethyl, propyl or the like. When the alkyl group has 3 or more carbon atoms, it may be of either a straight-chain form or branched form and also may contain a cyclic portion. A preferred alkyl group containing a cyclic portion and represented by $R^2$ includes those containing a cyclic alkyl group at the middle or terminal and bonding to the nitrogen atom through —$CH_2$—. Particularly preferred examples are a cyclohexylmethyl group and a cyclohexylethyl group. When $R^2$ is an alkyloxy group, it may be, for example, methoxy, ethoxy, hexyloxy, octyloxy or the like. Similarly, when the alkyloxy group has 3 or more carbon atoms, its alkyl moiety may be of either a straight-chain form or branched form and also may contain a cyclic portion. The alkyloxy group containing a cyclic portion and represented by $R^2$ may be a cyclic alkyloxy group such as cyclohexyloxy. Among these $R^2$s, preferred ones include hydrogen, a $C_1$–$C_3$ alkyl, octyloxy, cyclohexyloxy and hydroxyl.

The symbol n in the formula (I) is an integer of 2 to 8, and alkylene represented by —$C_nH_{2n}$— may be of either a straight-chain form or branched form. Specific examples of alkylene represented by —$C_nH_{2n}$— include ethylene, 1,2- or 1,3-propylene, 1,2-, 1,3- or 1,4-butylene, pentamethylene, hexamethylene, octamethylene and the like. Particularly preferably, n is 6, i.e. —$C_nC_{2n}$— is hexamethylene.

Among the hindered piperidine compounds represented by the formula (I), particularly useful ones as a stabilizer are compounds in which $R^1$ is 2,2,6,6-tetramethyl- 4-piperidyl, 1,2,2,6,6-pentamethyl-4-piperidyl, 2,2,6,6-tetramethyl-1-octyloxy-4-piperidyl, methyl, 2-ethylhexyl or hydrogen, $R^2$ is hydrogen, methyl, methoxy or octyloxy and n is 6. Among these, compounds in which $R^1$ is 4-piperidyl or methyl and $R^2$ is hydrogen are particularly preferred.

In the aforementioned EP-A-34829, particularly in Example 3 thereof, there is disclosed a method for producing one of the compounds represented by the foregoing formula (I), i.e. a compound wherein $R^1$ is methyl and $R^2$ is hydrogen, by subjecting N,N'-bis(2,2,6,6-tetramethyl- 4-piperidyl)-1,6-hexanediamine and methyl acrylate together to Michael reaction. According to the method described above, hindered piperidine compounds represented by the formula (I), particularly those in which $R^1$ is a lower alkyl group, can be produced. That is, a hindered piperidine compound represented by the formula (I) is obtained by Michael reaction of an alkylenediamine compound represented by the formula (III),

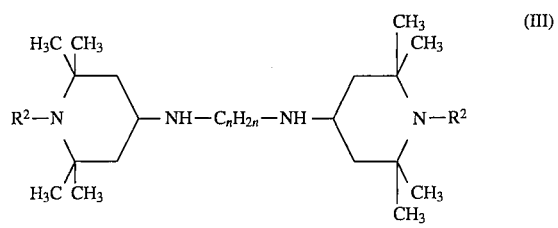

wherein $R^2$ and n are as defined above, and an acrylic acid ester represented by the formula (IV),

wherein $R^1$ is as defined above.

Specific examples of the alkylenediamine compound represented by the formula (III) include the following:

N,N'-bis(2,2,6,6-tetramethyl-4-piperidyl)-1,6-hexanediamine,

N,N'-bis(2,2,6,6-tetramethyl-4-piperidyl)-ethylenediamine,

N,N'-bis(2,2,6,6-tetramethyl-4-piperidyl)-1,4-butanediamine,

N,N'-bis(2,2,6,6-tetramethyl-4-piperidyl)-1,8-octanediamine,

N,N'-bis(1,2,2,6,6-pentamethyl-4-piperidyl)- 1,6-hexanediamine,

N,N'-bis(1-hydroxy-2,2,6,6-tetramethyl-4-piperidyl)-1,6-hexanediamine,

N,N'-bis(1-methoxy-2,2,6,6-tetramethyl-4-piperidyl)-1,6-hexanediamine,

N,N'-bis(2,2,6,6-tetramethyl-1-octyloxy-4-piperidyl)-1,6-hexanediamine and the like.

Specific examples of the acrylic acid ester represented by the formula (IV) include methyl acrylate, ethyl acrylate and the like. Among these, methyl acrylate is particularly preferably used.

Usually, it is preferred to carry out the reaction of the alkylenediamine compound of the formula (III) with the acrylic acid ester of the formula (IV) in a solvent. The preferred solvent includes alcohols such as methanol, ethanol, isopropanol and butanol, aromatic hydrocarbons such as benzene, toluene and mesitylene, chlorinated hydrocarbons such as chloroform and carbon tetrachloride, ethers such as tetrahydrofuran and 1,4-dioxane, and the like. Among these, methanol is preferably used particularly when the compound of the formula (IV) is methyl acrylate.

In this reaction, it is preferred to use the acrylic acid ester (IV) in an amount of from about twice by mole to a slight excess based on the alkylenediamine compound (III). More generally, the amount of the acrylic acid ester (IV) per mole of the alkylenediamine compound (III) is preferably in the range of from about 2 to about 4 moles, more preferably in the range of from about 2.0 to about 2.5 moles. Usually, this reaction proceeds in the range of from about 20° C. to refluxing temperature, but preferably it is carried out under reflux. This reaction usually proceeds under an atmospheric pressure, but it may be carried out under pressure.

In the method with Michael reaction, the acrylic acid ester (IV) reacts with the alkylenediamine compound (III) in relatively good efficiency to give the hindered piperidine compound (I) if $R^1$ in the formula (IV) representing the acrylic acid ester is a lower alkyl group of the same bulkiness as that of methyl, ethyl, propyl and, at most, butyl. It was found, however, that the yield of the hindered piperidine compound (I) lowers as $R^1$ in the formula (IV) becomes large in its steric bulkiness. The present inventors, therefore, have extensively studied how to produce the hindered piperidine compound of the formula (I) wherein $R^1$ is limited, among those defined hereinbefore, to an N-substituted or N-unsubstituted 2,2,6,6-tetramethyl-4-piperidyl group, an alkyl group having 3 or more carbon atoms or an arylalkyl group. As a result, the present inventors have found a method giving an increased yield.

That is, the desired hindered piperidine compound represented by the formula (I) wherein $R^1$ is an N-substituted or N-unsubstituted 2,2,6,6-tetramethyl-4-piperidyl group, a $C_3$–$C_{18}$ alkyl group which may contain a cyclic portion, or a $C_7$–$C_{18}$ arylalkyl group, can be produced by firstly synthesizing a compound of the formula (I) wherein $R^1$ is methyl or ethyl, i.e. a lower alkyl ester represented by the formula (Ia),

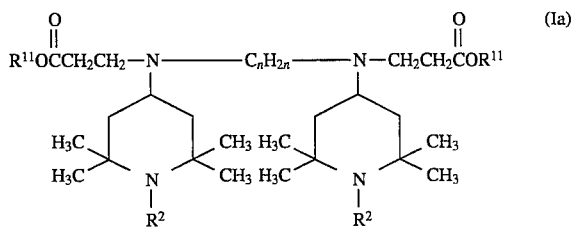

wherein $R^{11}$ is methyl or ethyl, and $R^2$ and n are as defined above, by Michael reaction, if necessary, isolating and purifying the resulting compound (Ia) by the known methods, and then subjecting the isolated and purified product or the reaction mixture and an alcohol represented by the formula (V),

wherein $R^1$ is an N-substituted or N-unsubstituted 2,2,6,6-tetramethyl- 4-piperidyl group, a $C_3$–$C_{18}$ alkyl group which may contain a cyclic portion, or a $C_7$–$C_{18}$ arylalkyl group, to transesterification.

This transesterification is carried out in the presence of a transesterification catalyst. Among the compounds of the formula (I) wherein $R^1$ is propyl or butyl are also those which can be produced in moderate yields by Michael reaction, but transesterification is more advantageous.

In the lower alkyl ester of the formula (Ia) which is a material for transesterification, a particularly preferred $R^{11}$ is methyl. Consequently, specific examples of the hindered piperidine compound of the formula (Ia) used in the transesterification include the following:

N,N'-bis(2-methoxycarbonylethyl)-N,N'-bis( 2,2,6,6-tetramethyl-4-piperidyl)-1,6-hexanediamine, N,N'-bis(2-methoxycarbonylethyl)-N,N'-bis( 1,2,2,6,6-pentamethyl-4-piperidyl)-1,6-hexanediamine, N,N'-bis(2-methoxycarbonylethyl)-N,N'-bis( 2,2,6,6-tetramethyl-1-octyloxy-4-piperidyl)-1,6-hexanediamine and the like.

Specific examples of the alcohol represented by the formula (V) include 2,2,6,6-tetramethyl-4-piperidinol, 1,2, 2,6,6-pentamethyl-4-piperidinol, 2,2,6,6-tetramethyl-1-octyloxy-4-piperidinol, 1-methoxy- 2,2,6,6-tetramethyl-4-piperidinol, hexanol, octanol, 2-ethyl-1-hexanol, octadecanol, benzyl alcohol and the like.

Specific examples of the transesterification catalyst include lithium amide, sodium methoxide, potassium methoxide, lithium methoxide, tin oxide and the like.

Usually, it is preferred to carry out the transesterification of the lower alkyl ester of the formula (Ia) with the alcohol of the formula (V) in a solvent. The preferred solvent includes aromatic hydrocarbons such as benzene, toluene, xylene, cymene, monochlorobenzene and o-dichlorobenzene, ethers such as tetrahydrofuran and 1,4-dioxane, and the like.

In this reaction, it is preferred to use the alcohol (V) in an amount of from about twice by mole to a slight excess based on the lower alkyl ester (Ia). More generally speaking, the amount of the alcohol (V) per mole of the lower alkyl ester (Ia) is preferably in the range of from about 2 to about 4 moles, more preferably in the range of from about 2.0 to about 2.5 moles.

In this reaction, it is also preferred to use the transesterification catalyst in an amount ranging from about 0.02 to about 0.2 mole based on mole of the lower alkyl ester (Ia).

This transesterification usually proceeds in the range of from about 20° C. to refluxing temperature, but preferably it is carried out under reflux. Also, this reaction usually proceeds under an atmospheric pressure, but it may be carried out under reduced pressure or under pressure. Further, it is preferred to carry out this reaction While removing a low-boiling alcohol produced with the progress of the reaction out of the reaction system.

The compound of the formula (I) wherein $R^1$ is a hydroxyl group can be produced by hydrolyzing a compound of the formula (I) wherein $R^1$ is a lower alkyl group, for example, the lower alkyl ester represented by the formula (Ia).

After Michael reaction of the alkylenediamine compound of the formula (III) with the acrylic acid ester of the formula (IV) has come to an end, the desired hindered piperidine compound of the formula (I) can be isolated by removing the solvent used, or removing the solvent and catalyst when transesterification or hydrolysis has been carried out as need arises. If necessary, a purification operation may further be applied by the known methods.

Any hindered piperidine compound in the scope of the formula (I) can be produced by selecting proper materials and applying the above operation.

Further, if necessary, the groups $R^2$ in the formula (I) and/or $R^3$ in the formula (II) can be modified by firstly producing the compound of the formula (I) wherein $R^1$ is alkyl or arylalkyl and $R^2$ is hydrogen, or the compound of the formula (I) wherein $R^1$ is N-unsubstituted 2,2,6,6-tetramethyl-4-piperidyl and $R^2$ is hydrogen, or the compound of the formula (I) wherein $R^1$ is 4-piperidyl represented by the formula (II) and either one of $R^2$ or $R^3$ is hydrogen, and then treating the resulting compound according to the known methods, for example, methods disclosed in EP-A-319,480, U.S. Pat. No. 4,665,185 and particularly Examples 14, 23, 38, 48 and 60 to 65 of EP-A-309,402.

For example, by treating the compound of the formula (I) wherein $R^1$ is alkyl or arylalkyl and $R^2$ is hydrogen with a mixture of formaldehyde and formic acid, $R^2$ can be methylated. Also, by treating the compound of the formula (I) wherein $R^1$ is N-unsubstituted 2,2,6,6-tetramethyl- 4-piperidyl and $R^2$ is hydrogen with a mixture of formaldehyde and formic acid, the N-position of the 2,2,6,6-tetramethyl-4-piperidyl group and $R^2$ can be methylated at the same time. Further, by reacting the compound of the formula (I) wherein $R^2$ is hydrogen, or the compound of the formula (I) wherein $R^1$ is 4-piperidyl represented by the formula (II) and $R^3$ is hydrogen with an oxidizing agent, e.g. hydroperoxide, and then reducing the resulting compound, $R^2$ and/or $R^3$ can be converted to a hydroxyl group. Still further, by reacting the compound of the formula (I) wherein $R^2$ is hydrogen, or the compound of the formula (I) wherein $R^1$ is 4-piperidyl represented by the formula (II) and $R^3$ is hydrogen with an alkane or cycloalkane in the presence of an oxidizing agent, an alkyloxy or cycloalkyloxy group can be introduced into $R^2$ and/or $R^3$.

Specific examples of the hindered piperidine compound of the formula (I) thus obtained include the following.

Compound A: N,N'-bis(2-methoxycarbonylethyl)-N,N'-bis(2,2,6,6-tetramethyl-4-piperidyl)-1,6-hexanediamine, Compound B: N,N'-bis[2-(2,2,6,6-tetramethyl-4-piperidyloxycarbonyl)ethyl] -N,N'-bis(2,2,6,6-tetramethyl- 4-piperidyl)-1,6-hexanediamine, Compound C: N,N'-bis(2-carboxyethyl)-N,N'-bis( 2,2,6, 6-tetramethyl-4-piperidyl)-1,6-hexanediamine, Compound D: N,N'-bis(2-ethoxycarbonylethyl)-N,N'-bis(2,2,6,6-tetramethyl-4-piperidyl)-1,6-hexanediamine, Compound E: N,N'-bis(2-propoxycarbonylethyl)-N,N'-bis(2,2,6,6-tetramethyl-4-piperidyl)-1,6-hexanediamine, Compound F: N,N'-bis(2-isopropoxycarbonylethyl)-N,N'-bis(2,2,6,6-tetramethyl-4-piperidyl)- 1,6-hexanediamine, Compound G: N,N'-bis(2-butoxycarbonylethyl)-N,N'-bis(2,2,6,6-tetramethyl-4-piperidyl)-1,6-hexanediamine, Compound H: N,N'-bis(2-isobutoxycarbonylethyl)-N,N'-bis(2,2,6,6-tetramethyl-4-piperidyl)-1,6-hexanediamine, Compound I: N,N'-bis(2-pentyloxycarbonylethyl)-N,N'-bis(2,2,6,6-tetramethyl-4-piperidyl)-1,6-hexanediamine, Compound J: N,N'-bis(2-hexyloxycarbonylethyl)-N,N'-bis(2,2,6,6-tetramethyl-4-piperidyl)-1,6-hexanediamine, Compound K: N,N'-bis(2-cyclohexyloxycarbonylethyl)-N,N' -bis(2,2,6,6-tetramethyl-4-piperidyl)-1,6-hexanediamine, Compound L: N,N'-bis(2-octyloxycarbonylethyl)-N,N'-bis(2,2,6,6-tetramethyl-4-piperidyl)-1,6-hexanediamine, Compound M: N,N'-bis[2-(2-ethylhexyloxycarbonyl)ethyl] -N,N'-bis(2,2,6,6-tetramethyl-4-piperidyl)- 1,6-hexanediamine, Compound N: N,N'-bis(2-dodecyloxycarbonylethyl)-N, N' -bis(2,2,6,6-tetramethyl-4-piperidyl)-1,6-hexanediamine, Compound O: N,N'-bis(2-octadecyloxycarbonylethyl)-N, N' -bis(2,2,6,6-tetramethyl-4-piperidyl)-1,6-hexanediamine, Compound P: N,N'-bis(2-benzyloxycarbonylethyl)-N,N'-bis(2,2,6,6-tetramethyl-4-piperidyl)-1,6-hexanediamine, Compound Q: N,N'-bis(2-methoxycarbonylethyl)-N,N' -bis(1,2,2,6,6-pentamethyl-4-piperidyl)-1,6-hexanediamine, Compound R: N,N'-bis(2-methoxycarbonylethyl)-N,N' -bis(2,2,6,6-tetramethyl-1-octyloxy-4-piperidyl)-1,6-hexanediamine, Compound S: N,N'-bis(2-methoxycarbonylethyl)-N,N' -bis(1-hydroxy-2,2,6,6-tetramethyl-4-piperidyl)-1,6-hexanediamine, Compound T: N,N'-bis[2-(1,2,2,6,6-pentamethyl- 4-piperidyloxycarbonyl)ethyl]-N,N'-bis(2,2,6,6-tetramethyl- 4-piperidyl)-1,6-hexanediamine, Compound U: N,N'-bis[2-(1,2,2,6,6-pentamethyl- 4-piperidyloxycarbonyl)ethyl]-N,N'-bis(1,2,2,6,6-pentamethyl- 4-piperidyl)-1,6-hexanediamine, Compound V: N,N'-bis[2-(2,2,6,6-tetramethyl-4-piperidyloxycarbonyl)ethyl] -N,N'-bis(1,2,2,6,6-pentamethyl- 4-piperidyl)-1,6-hexanediamine, Compound W: N,N'-bis[2-(2,2,6,6-tetramethyl-1-octyloxy- 4-piperidyloxycarbonyl)ethyl]-N,N'-bis(2,2,6,6-tetramethyl- 1-octyloxy-4-piperidyl)-1,6-hexanediamine, Compound X: N,N'-bis[2-(2,2,6,6-tetramethyl-4-piperidyloxycarbonyl)ethyl] -N,N'-bis(2,2,6,6-tetramethyl- 4-piperidyl)ethylenediamine, Compound Y: N,N'-bis(2-methoxycarbonylethyl)-N,N' -bis(2,2,6,6-tetramethyl-4-piperidyl)ethylenediamine.

The hindered piperidine compound represented by the formula (I) is itself a white solid or colorless liquid. This compound is effective to stabilize various kinds of organic material, particularly organic materials having a property to deteriorate by the action of light. Also, this compound does not color the organic materials when added thereto.

The organic material which can be stabilized by the present invention may be any of those having a property to deteriorate by the action of light, there being no special limitation to target organic materials. Specific examples of the material include the following synthetic resins, rubbers, paints, oils and the like. These materials can be stabilized alone or in mixture of two or more of them.

Polyethylene such as low-density polyethylene (LD-PE), high-density polyethylene (HD-PE), and linear low-density polyethylene (LLD-PE);

Polypropylene;

Methylpentene polymer;

EEA (ethylene/ethyl acrylate copolymer) resin;

EVA (ethylene/vinyl acetate copolymer) resin;

polystyrenes such as polystyrene, poly(p-methylstyrene), and poly(α-methylstyrene);

AS (acrylonitrile/styrene copolymer) resin;

ABS (acrylonitrile/butadiene/styrene copolymer) resin;

AAS (special acrylic rubber/acrylonitrile/styrene copolymer) resin;

ACS (acrylonitrile/chlorinated polyethylene/styrene copolymer) resin;

Chlorine-containing polymers such as chlorinated polyethylene, polychloroprene, chlorinated rubber, polyvinyl chloride, and polyvinylidene chloride;

Methacrylic resin;

Ethylene/vinyl alcohol copolymer resin;

Fluorocarbon resin;

Polyacetal;

Grafted polyphenylene ether resin and polyphenylene sulfide resin;

Polyurethane;

Polyamide;

Polyethylene terephthalate and polybutylene terephthalate;

Polycarbonate;

Polyacrylate;

Polysulfone, polyetherether ketone and polyether sulfone;

Aromatic polyester resin;

Epoxy resin;

Diallylphthalate prepolymer;

Silicone resin;

Unsaturated polyester resin;

Acryl-modified benzoguanamine resin;

Benzoguanamine/melamine resin;

Urea resin;

Polybutadiene;

1,2-Polybutadiene;

Polyisoprene;

Styrene/butadiene copolymer;

Butadiene/acrylonitrile copolymer;

Ethylene/propylene copolymer;

Silicone rubber;

Epichlorohydrin rubber;

Acrylic rubber;

Natural rubber;

Chlorinated rubber paint;

Polyester resin paint;

Urethane resin paint;

Epoxy resin paint;

Acrylic resin paint;

Vinyl resin paint;

Aminoalkyl resin paint;

Alkyd resin paint;

Nitrocellulose resin paint;

Oil paint;

Wax; and

Lubricant.

The hindered piperidine compound represented by the formula (I) is blended in a stabilizing amount with organic materials. The preferred amount of the compound varies also with the kind of target organic materials, but it is usually preferred to use the compound in the range of from about 0.01 to about 5 parts by weight based on 100 parts by weight of the organic material. More preferably, the hindered piperidine compound represented by the formula (I) is used in the range of from about 0.02 to about 2 parts by weight based on 100 parts by weight of the organic material.

If necessary, other additives may further be incorporated into organic material compositions obtained by blending the hindered piperidine compound of the formula (I) according to the present invention. Other additives include, for example, phenolic antioxidants, sulfur-containing antioxidants, phosphorus-containing antioxidants, ultraviolet absorbers, hindered amine light stabilizers other than the compound of the formula (I), lubricants, plasticizers, flame retardants, nucleating agents, metal deactivators, antistatic agents, pigments, inorganic fillers and the like. These additives and the hindered piperidine compound of the formula (I) may be blended with organic materials at the same time or at separate steps.

In blending the organic materials with the hindered piperidine compound of the formula (I) and, if necessary, optionally used other additives, all the known methods and apparatus for obtaining a homogeneous mixture may be employed. For example, when the organic material is a solid polymer, these compound and/or additives may be blended with the solid polymer directly or in the form of a master batch. When the organic material is a synthetic polymer, these compound and/or additives may be blended with the polymer by not only the method described above, but also a method in which the solution or dispersion of these compound and/or additives is blended with the solution of the polymer in the course of polymerization of the polymer or immediately after finish of the polymerization. When the organic material is a liquid such as oils, these compound and/or additives may directly be added to dissolve them in the liquid, or may be added in the form of a solution or dispersion in a liquid medium.

The present invention will be explained in more detail with reference to the following examples, but it is not to be interpreted as being limited thereto. All percents and parts in the examples are by weight unless otherwise stated.

EXAMPLE 1

Production of
N,N'-bis(2-methoxycarbonylethyl)-N,N'-bis(
2,2,6,6-tetramethyl-4-piperidyl)-1,6-hexanediamine
(Compound A)

Eighty grams (0.20 mole) of N,N'-bis(2,2,6,6-tetramethyl- 4-piperidyl)-1,6-hexanediamine and 200 g of methanol were added to a 1-liter four-necked flask, and the hexanediamine was completely dissolved in the methanol. To the resulting solution was added dropwise a solution of 35 g (0.41 mole) of methyl acrylate in 100 g of methanol at room temperature. Thereafter, reaction was continued for 12 hours under reflux. After the reaction finished, the solvent was removed by evaporation, and the residue obtained was recrystallized from hexane to obtain 98 g (0.17 mole) of the entitled Compound A as a white solid in a yield of 85%.

Mass analysis (FD-MS): m/z 566 (M)$^+$

Elementary analysis ($C_{32}H_{62}N_4O_4$): Found C 68.1%, H 10.9%, N 10.0% Calcd. C 67.8%, H 11.0%, N 9.9% m.p. 50°–52° C.

$^1$H-NMR (270 MHz, CDCl$_3$): δ 1.04(dd, J=12.5 and 12.2 Hz, 4H); 1.12(s, 12H); 1.19(s, 12H); 1.2–1.4(m, 4H); 1.4–1.5(m, 4H); 1.63(dd, J=12.5 and 2.9 Hz, 4H); 2.44(t, J=7.1 Hz, 4H); 2.44(t, J=7.2 Hz, 4H); 2.78(t, J=7.2 Hz, 4H); 2.97(tt, J=12.2 and 2.9 Hz, 2H); 3.67(s, 6H) ppm.

EXAMPLE 2

Production of
N,N'-bis(2-ethoxycarbonylethyl)-N,N'-bis(
2,2,6,6-tetramethyl-4-piperidyl)-1,6-hexanediamine
(Compound D)

Procedure was carried out according to Example 1 except that methyl acrylate was replaced by the equimolar amount of ethyl acrylate, to obtain Compound D in a yield of 91%.

Mass analysis (FD-MS): m/z 594 (M)$^+$

Elementary analysis ($C_{34}H_{66}N_4O_4$): Found C 68.7%, H 10.9%, N 9.6% Calcd. C 68.6%, H 11.1%, N 9.4% m.p. 58°–60° C.

¹H-NMR (270 MHz, CDCl₃): δ 1.04(dd, J=12.5 and 12.2 Hz, 4H); 1.12(s, 12H); 1.19(s, 12H); 1.2–1.4(m, 4H); 1.26(t, J=7.3 Hz, 6H); 1.4–1.5(m, 4H); 1.62(dd, J=12.5 and 2.9 Hz, 4H); 2.42(t, J=7.1 Hz, 4H); 2.43(t, J=7.1 Hz, 4H); 2.78(t, J=7.1 Hz, 4H); 2.98(tt, J=12.2 and 2.9 Hz, 2H); 4.13(q, J=7.3 Hz, 4H) ppm.

EXAMPLE 3

Production of N,N'-bis(2-octadecyloxycarbonylethyl)-N,N'-bis(2,2,6,6-tetramethyl-4-piperidyl)-1,6-hexanediamine (Compound O)

To a four-necked flask equipped with a stirrer and a reflux condenser were added 20.0 g (35 mmoles) of N,N'-bis(2-methoxycarbonylethyl)-N,N'-bis(2,2,6,6-tetramethyl-4-piperidyl)-1,6-hexanediamine (Compound A) obtained in Example 1, 21.0 g (77 mmoles) of stearyl alcohol and 200 ml of toluene, and the resulting mixture was stirred under reflux. To the reaction mixture was added dropwise a solution of 0.1 g (4 mmoles) of lithium amide in 3 g of methanol. Thereafter, the solvent was distilled off while adding toluene, to complete the reaction. After the reaction was continued for 4 hours, toluene was added, and the reaction mixture was cooled to room temperature. The organic layer was washed three times with water and concentrated to obtain 23 g (22 mmoles) of Compound O in a yield of 63%. The yield of Compound O based on N,N'-bis(2,2,6,6-tetramethyl-4-piperidyl)-1,6-hexanediamine was calculated as 54%.

Mass analysis (FD-MS): m/z 1043 (M+1)⁺

Elementary analysis (C₆₆H₁₃₀N₄O₄): Found C 75.9%, H 13.0%, N 5.0% Calcd. C 76.0%, H 12.6%, N 5.4% m.p. 45°–46° C.

¹H-NMR (270 MHz, CDCl₃): δ 0.88(t, J=6.6 Hz, 6H); 1.0–1.5(m, 68H); 1.04(dd, J=12.3 and 12.2 Hz, 4H); 1.12(s, 12H); 1.19(s, 12H); 1.6–1.7(m, 4H); 1.63(dd, J=12.2 and 2.6 Hz, 4H); 2.42(t, J=7.1 Hz, 8H); 2.78(t, J=7.1 Hz, 4H); 2.97(tt, J=12.3 and 2.6 Hz, 2H); 4.05(t, J=6.7 Hz, 4H) ppm.

EXAMPLE 4 (for comparison)

Production of N,N'-bis(2-octadecyloxycarbonylethyl)-N,N',-bis(2,2,6,6-tetramethyl-4-piperidyl)-1,6-hexanediamine (Compound O) by Michael reaction To a 1-liter four-necked flask were added 20 g (50 mmoles) of N,N'-bis(2,2,6,6-tetramethyl-4-piperidyl)-1,6-hexanediamine and 200 g of methanol, and the hexanediamine was completely dissolved in the methanol. To the resulting solution was added dropwise a solution of 32.4 g (0.1 mole) of octadecyl acrylate in 100 g of methanol at room temperature, after which reaction was continued for 12 hours under reflux. The solvent was removed by evaporation, and FD-MS measurement was carried out. As a result, it was found that N-(2-octadecyloxycarbonylethyl)-N,N'-bis(2,2,6,6-tetramethyl-4-piperidyl)-1,6-hexanediamine was produced in a small amount, but Compound O was not confirmed.

EXAMPLES 5 TO 16

Production of other compounds by transesterification

Procedure was carried out according to Example 3 except using varying alcohols as a material, to obtain the compounds shown in Table 1 in the respective yields. The yields described here are based on Compound A.

TABLE 1

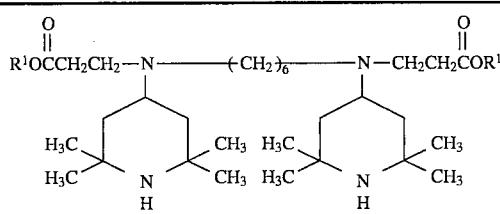

| Example No. | Compound | R¹ | Yield |
|---|---|---|---|
| 5 | B | 2,2,6,6-Tetramethyl-4-piperidyl | 80% |
| 6 | E | n-Propyl | 75% |
| 7 | F | Isopropyl | 82% |
| 8 | G | n-Butyl | 77% |
| 9 | H | Isobutyl | 79% |
| 10 | I | n-Pentyl | 54% |
| 11 | J | n-Hexyl | 89% |
| 12 | K | Cyclohexyl | 84% |
| 13 | L | n-Octyl | 92% |
| 14 | M | 2-Ethylhexyl | 92% |
| 15 | N | n-Dodecyl | 77% |
| 16 | P | Benzyl | 81% |

Compound B:

Mass analysis (FD-MS): m/z 816 (M)⁺

Elementary analysis (C₄₈H₉₂N₆O₄): Found C 70.3%, H 11.4%, N 10.0% Calcd. C 70.5%, H 11.3%, N 10.3%

¹H-NMR (270 MHz, CDCl₃): δ 1.05(dd, J=12.3 and 12.2 Hz, 4H); 1.13(s, 12H); 1.16(s, 12H); 1.19(s, 12H); 1.23(s, 12H); 1.1–1.5(m, 12H); 1.63(dd, J=12.3 and 2.7 Hz, 4H); 1.93(dd, J=12.5 and 4.2 Hz, 4H); 2.40(t, J=7.4 Hz, 4H); 2.43(t, J=7.6 Hz, 4H); 2.78(t, J=7.4 Hz, 4H); 2.98(tt, J=12.2 and 2.7 Hz, 2H); 5.20(tt, J=11.4 and 4.2 Hz, 2H) ppm.

Compound E:

Mass analysis (FD-MS): m/z 622 (M)⁺

Elementary analysis (C₃₆H₇₀N₄O₄): Found C 69.5%, H 11.1%, N 9.0% Calcd. C 69.4%, H 11.3%, N 9.0% m.p. 43°–44° C.

¹H-NMR (270 MHz, CDCl₃): δ 0.95(t, J=7.0 Hz, 6H); 1.04(dd, J=12.5 and 12.2 Hz, 4H); 1.12(s, 12H); 1.19(s, 12H); 1.2–1.3(m, 4H); 1.4–1.5(m, 4H); 1.63(dd, J=12.5 and 3.0 Hz, 4H); 1.6–1.7(m, 4H); 2.43(t, J=7.3 Hz, 8H); 2.78(t, J=7.3 Hz, 4H); 2.98(tt, J=12.2 and 3.0 Hz, 2H); 4.03(t, J=7.0 Hz; 4H) ppm.

Compound F:

Mass analysis (FD-MS): m/z 622 (M)⁺

Elementary analysis (C₃₆H₇₀N₄O₄): Found C 69.2%, H 11.1%, N 9.4% Calcd. C 69.4%, h 11.3%, N 9.0%

¹H-NMR (270 MHz, CDCl₃): δ 1.04(dd, J=12.5 and 12.2 Hz, 4H); 1.12(s, 12H); 1.19(s, 12H); 1.2–1.3(m, 4H); 1.24(d, J=6.3 Hz, 12H); 1.4–1.5(m, 4H); 1.63(dd, J=12.5 and 3.0 Hz, 4H); 2.39(t, J=7.0 Hz, 4H); 2.42(t, J=7.3 Hz, 4H); 2.77(t, J=7.3 Hz, 4H); 2.98(tt, J=12.2 and 3.0 Hz, 2H); 5.00(hept, J=6.3 Hz, 2H) ppm.

Compound G:

Mass analysis (FD-MS): m/z 650 (M)⁺

Elementary analysis (C₃₈H₇₄N₄O₄): Found C 70.2%, H 11.2%, N 8.7% Calcd. C 70.1%, H 11.5%, N 8.6% m.p. 66°–67° C.

¹H-NMR (270 MHz, CDCl₃): δ 0.94(t, J=7.3 Hz, 6H); 0.9–1.1(m, 4H); 1.12(s, 12H); 1.19(s, 12H); 1.2–1.3(m, 4H); 1.3–1.5(m, 8H); 1.6–1.7(m, 8H); 2.42(t, J=7.3 Hz, 8H); 2.78(t, J=7.3 Hz, 4H); 2.97(tt, J=12.2 and 3.1 Hz, 2H); 4.07(t, J=6.6 Hz, 4H) ppm.

Compound H:

Mass analysis (FD-MS): m/z 650 (M)$^+$

Elementary analysis ($C_{38}H_{74}N_4O_4$): Found C 70.2%, H 12.0%, N 8.6% Calcd. C 70.1%, H 11.5%, N 8.6% m.p. 72°–73° C.

$^1$H-NMR (270 MHz, CDCl$_3$): δ 0.94(d, J=6.6 Hz, 12H); 1.04(dd, J=12.5 and 12.2 Hz, 4H); 1.12(s, 12H); 1.19(s, 12H); 1.2–1.3(m, 4H); 1.4–1.5(m, 4H); 1.63(dd, J=12.5 and 3.0 Hz, 4H); 1.8–2.0(m, 2H); 2.44(t, J=7.3 Hz, 8H); 2.79(t, J=7.3 Hz, 4H); 2.98(tt, J=12.2 and 3.0 Hz, 2H); 3.86(d, J=6.6 Hz, 4H) ppm.

Compound I:

Mass analysis (FD-MS): m/z 678 (M)$^+$

Elementary analysis ($C_{40}H_{78}N_4O_4$): Found C 70.7%, H 11.8%, N 8.3% Calcd. C 70.8%, H 11.6%, N 8.3% m.p. 36°–37° C.

$^1$H-NMR (270 MHz, CDCl$_3$): δ 0.91(t, J=7.1 Hz, 6H); 0.9–1.1(m, 4H); 1.12(s, 12H); 1.19(s, 12H); 1.2–1.5(m, 16H); 1.6–1.7(m, 8H); 2.42(t, J=7.2 Hz, 8H); 2.78(t, J=7.2 Hz, 4H); 2.97(tt, J=12.4 and 3.1 Hz, 2H); 4.06(t, J=6.9Hz, 4H) ppm.

Compound J:

Mass analysis (FD-MS): m/z 706 (M)$^+$

Elementary analysis ($C_{42}H_{82}N_4O_4$): Found C 71.4%, H 12.0%, N 8.1% Calcd. C 71.3%, H 11.7%, N 8.0%

$^1$N-NMR (270 MHz, CDCl$_3$): δ 0.89(t, J=6.8 Hz, 6H); 0.9–1.1(m, 4H); 1.12(s, 12H); 1.19(s, 12H); 1.2–1.5(m, 20H); 1.6–1.7(m, 8H); 2.42(t, J=7.2 Hz, 8H); 2.78(t, J=7.2 Hz, 4H); 2.97(tt, J=12.2 and 3.0 Hz, 2H); 4.06(t, J=6.8 Hz, 4H) ppm.

Compound K:

Mass analysis (FD-MS): m/z 704 (M)$^+$

Elementary analysis ($C_{42}H_{78}N_4O_4$): Found C 71.6%, H 11.4%, N 8.4% Calcd. C 71.8%, H 11.2%, N 8.0%

$^1$H-NMR (270 MHz, CDCl$_3$): δ 1.04(dd, J=12.5 and 12.2 Hz, 4H); 1.12(s, 12H); 1.19(s, 12H); 1.2–2.0(m, 28H); 1.63(dd, J=12.5 and 3.0 Hz, 4H); 2.40(t, J=7.3 Hz, 4H); 2.43(t, J=6.3 Hz, 4H); 2.78(t, J=7.3 Hz, 4H); 2.98(tt, J=12.2 and 3.0 Hz, 2H); 4.7–4.8(m, 2H) ppm.

Compound L:

Mass analysis (FD-MS): m/z 762 (M)$^+$

Elementary analysis ($C_{46}H_{90}N_4O_4$): Found C 72.1%, H 12.4%, N 7.5% Calcd. C 72.4%, H 11.9%, N 7.4%

$^1$H-NMR (270 MHz, CDCl$_3$): δ 0.88(t, J=6.8 Hz, 6H); 1.04(dd, J=12.5 and 12.2 Hz, 4H); 1.12(s, 12H); 1.19(s, 12H); 1.2–1.5(m, 28H); 1.6–1.7(m, 4H); 1.63(dd, J=12.5 and 2.6 Hz, 4H); 2.42(t, J=7.2 Hz, 8H); 2.78(t, J=7.2 Hz, 4H); 2.97(tt, J=12.2 and 2.6 Hz, 2H); 4.06(t, J=6.8 Hz, 4H) ppm.

Compound M:

Mass analysis (FD-MS): m/z 763 (M+1)$^+$

Elementary analysis ($C_{46}H_{90}N_4O_4$): Found C 72.4%, H 11.5%, N 7.8% Calcd. C 72.4%, H 11.9%, N 7.4%

$^1$N-NMR (270 MHz, CDCl$_3$): δ 0.89(t, J=7.4 Hz, 12H); 1.04(dd, J=12.9 and 12.1 Hz, 4H); 1.12(s, 12H); 1.19(s, 12H); 1.2–1.5(m, 24H); 1.5–1.7(m, 2H); 1.63(dd, J=12.9 and 3.0 Hz, 4H); 2.43(t, J=7.3 Hz, 8H); 2.79(t, J=7.3 Hz, 4H); 2.97(tt, J=12.1 and 3.0 Hz, 2H); 3.98 (dd, J=5.8 and 1.2 Hz, 4H) ppm.

Compound N:

Mass analysis (FD-MS): m/z 874 (M)$^+$

Elementary analysis ($C_{54}H_{106}N_4O_4$): Found C 74.0%, H 12.7%, N 6.0% Calcd. C 74.1%, H 12.2%, N 6.4%

$^1$N-NMR (270 MHz, CDCl$_3$): δ 0.88(t, J=6.8 Hz, 6H); 1.04(dd, J=12.3 and 12.2 Hz, 4H); 1.12(s, 12H); 1.19 (s, 12H); 1.2–1.5(m, 40H); 1.6–1.7(m, 8H); 1.63(dd, J=12.2 and 2.5 Hz, 4H); 2.42(t, J=7.2 Hz, 8H); 2.78(t, J=7.2 Hz, 4H); 2.97 (tt, J= 12.3 and 2.5 Hz, 2H); 4.05(t, J=6.8 Hz, 4H) ppm.

Compound P:

Mass analysis (FD-MS): m/z 718 (M)$^+$

Elementary analysis ($C_{44}H_{70}N_4O_4$): Found C 73.3%, H 10.3%, N 7.7% Calcd. C 73.5%, H 9.8%, N 7.8%

$^1$H-NMR (270 MHz, CDCl$_3$): δ 1.02(dd, J=12.5 and 12.0 Hz, 4H); 1.10(s, 12H); 1.16(s, 12H); 1.3–1.4(m, 4H); 1.4–1.6(m, 4H); 1.60(dd, J=12.5 and 3.0 Hz, 4H); 2.42(t, J=7.3 Hz, 4H); 2.48(t, J=7.3 Hz, 4H); 2.80(t, J=7.3 Hz, 4H); 2.96(tt, J=12.0 and 3.0 Hz, 2H); 5.11(s, 4H); 7.3–7.5(m, 10H) ppm.

EXAMPLE 17 (for comparison)

Production of N,N'-bis(2-n-butoxycarbonylethyl)-N,N'-bis(2,2,6,6-tetramethyl-4-piperidyl)-1,6-hexanediamine (Compound G)

Procedure was carried out according to Example 4 except that octadecyl acrylate was replaced by the equimolar amount of n-butyl acrylate, to obtain Compound G in a yield of 53%.

EXAMPLE 18

Production of N,N'-bis(2-methoxycarbonylethyl)-N,N'-bis(1,2,2,6,6-pentamethyl-4-piperidyl)-1,6-hexanediamine (Compound Q)

To a four-necked flask equipped with a stirrer and a reflux condenser were added 3.7 g (41 mmoles) of a 37% aqueous formaldehyde solution, 100 ml of toluene and 1.9 g (41 mmoles) of formic acid. To the resulting mixture was added dropwise a solution of 10 g (17 mmoles) of N,N'-bis(2-methoxycarbonylethyl)-N,N'-bis(2,2,6,6-tetramethyl- 4-piperidyl)-1,6-hexanediamine (Compound A) obtained in Example 1 in 50 ml of toluene. Thereafter, the resulting mixture was refluxed for 3 hours. After the reaction finished, a 5% aqueous sodium hydroxide solution was added to separate the reaction mixture into two layers. The organic layer of the two layers was washed three times with water. The solvent was removed by evaporation to obtain 9 g (15 mmoles) of Compound Q as a viscous liquid in a yield of 88%.

Mass analysis (FD-MS): m/z 594 (M)$^+$

Elementary analysis ($C_{34}H_{66}N_4O_4$): Found C 69.7%, H 11.1%, N 10.2% Calcd. C 68.6%, H 11.2%, N 9.4%

$^1$N-NMR (270 MHz, CDCl$_3$): δ 1.00(s, 12H); 1.14(s, 12H); 1.1–1.6(m, 16H); 2.22(s, 6H); 2.42(t, J=7.0 Hz, 4H); 2.43(t, J=7.0 Hz, 4H); 2.78(t, J=7.0 Hz, 4H); 2.8–2.9(m, 2H); 3.66(s, 6H) ppm.

EXAMPLE 19

Production of N,N'-bis(2-carboxyethyl)-N,N'-bis(2,2,6,6-tetramethyl-4-piperidyl)-1,6-hexanediamine (Compound C)

To a four-necked flask equipped with a stirrer and a reflux condenser were added 26.3 g (46 mmoles) of N,N'-bis(2-methoxycarbonylethyl)-N,N'-bis(2,2,6,6-tetramethyl- 4-piperidyl)-1,6-hexanediamine (Compound A) obtained in Example 1 and 100 g of water. The resulting mixture was stirred at room temperature. After dissolution of Compound A was confirmed, 100 ml of hexane was added to separate the reaction mixture into two layers. The aqueous layer of the two layers was isolated and concentrated to obtain 23 g (43 mmoles) of Compound C in a yield of 92%.

Mass analysis (FD-MS): m/z 538 (M)$^+$ m.p.: >250° C.

Elementary analysis ($C_{30}H_{58}N_4O_4$): Found C 66.4%, H 10.9%, N 10.2% Calcd. C 66.9%, H 10.9%, N 10.4%

$^1$H-NMR (270 MHz, $D_2O$): δ 1.3–1.5(m, 4H); 1.37(s, 12H); 1.43(s, 12H); 1.5–1.7(m, 8H), 1.9–2.1(m, 4H); 2.44(t, J=7.6 Hz, 4H); 2.72(t, J=7.8 Hz, 4H); 2.97(t, J=7.6 Hz, 4H); 3.3–3.4(m, 2H) ppm.

EXAMPLE 20

Production of N,N'-bis(2-methoxycarbonylethyl)-N,N'-bis(1-hydroxy-2,2,6,6-tetramethyl-4-piperidyl)-1,6-hexanediamine (Compound S)

To a four-necked flask equipped with a stirrer and a reflux condenser were added 20.0 g (35 mmoles) of N,N'-bis(2-methoxycarbonylethyl)-N,N'-bis(2,2,6,6-tetramethyl-4-piperidyl)-1,6-hexanediamine (Compound A) obtained in Example 1, 0.2 g (0.75 mmole) of molybdenum hexacarbonyl and 200 ml of dichloroethane. The resulting mixture was stirred at 60° C. To the reaction mixture was then slowly added dropwise 28 g (248 mmoles) of tert-butyl hydroperoxide, after which reaction was continued for 8 hours under reflux. Inorganic matters were removed by filtration, and the filtrate was washed with a 5% aqueous sodium sulfite solution. The solvent was concentrated, and the product obtained was purified by column chromatography on silica gel (eluent, hexane:ethyl acetate=2:1). Further, the purified product obtained here was added to an autoclave together with 100 ml of dry tetrahydrofuran, 5 g of magnesium sulfate and 2 g of 5% palladium on carbon, and the mixture was stirred at room temperature for 16 hours under a hydrogen pressure of 10 atm. After the solid matter was removed by filtration, the solvent was concentrated, and the product was purified by column chromatography on silica gel (eluent, hexane:ethyl acetate=1:1) to obtain 6 g (10 mmoles) of Compound S in a yield of 28%.

Mass analysis (FD-MS): m/z 598 (M)$^+$

Elementary analysis ($C_{32}H_{62}N_4O_6$): Found C 64.5%, H 10.4%, N 9.6% Calcd. C 64.2%, H 10.4%, N 9.4%

EXAMPLE 21

Weather resistance test of polypropylene

Blending:

| | |
|---|---|
| Unstabilized polypropylene | 100 parts |
| Calcium stearate | 0.05 part |
| Test Compound | 0.1 part |

The above blend was melt-kneaded at 230° C. on a 30 mmφ single-screw extruder and pelletized. This pellet was formed into a sheet of 1 mm in thickness at 230° C. on an injection molding machine. This sheet was used as a test piece. This test piece was put in a sunshine weather-O-meter having a light source of carbon arc and irradiated with light under conditions of a black panel temperature being 83° C. and no water spraying. The weather resistance was evaluated by a time which had passed until cracks appeared on the irradiated surface of the test piece.

The results are shown in Table 2.

TABLE 2

| | Test compound | Weather resistance |
|---|---|---|
| Present invention | Compound A | 780 hours |
| Comparison | None | 120 hours |

EXAMPLE 22

Weather resistance test of polypropylene

Blending:

| | |
|---|---|
| Unstabilized propylene/ethylene block copolymer*$^1$ | 100 parts |
| Calcium stearate | 0.05 part |
| Phenolic antioxidant*$^2$ | 0.1 part |
| Phosphorus-containing antioxidant*$^3$ | 0.05 part |
| Test compound | 0.2 part |

*$^1$Ethylene content of 7.3%
*$^2$3,9-Bis[2-{3-(3-tert-butyl-4-hydroxy-5-methylphenyl)propionyloxyy-1,1-dimethylethyl]-2,4,8,10-tetraoxaspiro[5.5]undecane
*$^3$Bis(2,4-di-tert-butylphenyl) pentaerythritol diphosphite The above blend was melt-kneaded at 230° C. on a 30 mmφ single-screw extruder and pelletized. This pellet was formed into a sheet of 1 mm in thickness at 230° C. on an injection molding machine. This sheet was used as a test piece. This test piece was put in a sunshine weather-O-meter having a light source of carbon arc and irradiated with light under conditions of a black panel temperature being 83° C. and a water spray cycle being 12 minutes/60 minutes. The weather resistance was evaluated by a time which had passed until cracks appeared on the irradiated surface of the test piece. The results are shown in Table 3.

TABLE 3

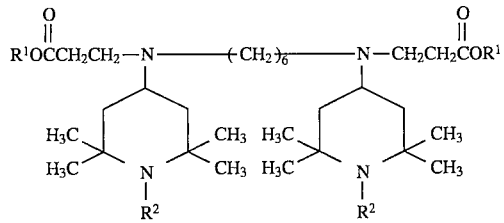

| Run No. | Symbol | R$^1$ | R$^2$ | Life until cracks appear (hour) |
|---|---|---|---|---|
| 1 | A | Methyl | H | 660 |
| 2 | B | 2,2,6,6-Tetramethyl-4-piperidyl | H | 960 |
| 3 | Q | Methyl | Methyl | 660 |
| 4 | C | H | H | 600 |
| 5 | D | Ethyl | H | 660 |
| 6 | E | n-Propyl | H | 660 |
| 7 | F | Isopropyl | H | 660 |
| 8 | G | n-Butyl | H | 660 |
| 9 | H | Isobutyl | H | 660 |
| 10 | I | n-Pentyl | H | 660 |
| 11 | J | n-Hexyl | H | 660 |
| 12 | K | Cyclohexyl | H | 660 |
| 13 | L | n-Octyl | H | 660 |
| 14 | M | 2-Ethylhexyl | H | 660 |
| 15 | N | n-Dodecyl | H | 660 |

TABLE 3-continued

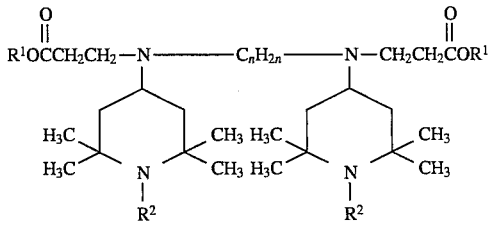

| Run No. | Symbol | Compound R¹ | R² | Life until cracks appear (hour) |
|---|---|---|---|---|
| 16 | O | n-Octadecyl | H | 600 |
| 17 | P | Benzyl | H | 600 |
| 18 | | None | | 120 |

The hindered piperidine compound of the present invention gives excellent properties as a stabilizer, particularly as a light stabilizer, to various organic materials including thermoplastic resins such as polyolefin. For example, a resin containing this piperidine compound is stable against photo-oxidation in practical use, and also brings about no color change due to the blending of the compound. Thus, molded products of high quality can be obtained from such a resin.

What is claimed is:

1. A method for stabilizing an organic material, comprising the step of blending the organic material with about 0.01 to about 5 parts by weight, based on 100 parts by weight of the organic material, of a hindered piperidine compound represented by formula (I), $$\underset{R^1OCCH_2CH_2-N\phantom{xxxxx}C_nH_{2n}\phantom{xxxxx}N-CH_2CH_2COR^1}{\overset{O\phantom{xxxxxxxxxxxxxxxxxxxxxxxxxxxxxxxxxxxxxx}O}{\|\phantom{xxxxxxxxxxxxxxxxxxxxxxxxxxxxxxxxxxxxxxxxxx}\|}} \quad (I)$$

wherein $R^1$ is a 2,2,6,6-tetramethyl-4-piperidyl group, a hydrogen atom, a $C_1$–$C_{18}$ alkyl group, or a $C_7$–$C_{18}$ arylalkyl group; $R^2$ is a hydrogen atom, a $C_1$–$C_{10}$ alkyl group, a $C_1$–$C_{18}$ alkyloxy group, or a hydroxyl group; and n is an integer of 2 to 8.

2. The method according to claim 1, wherein $R^1$ is a 2,2,6,6-tetramethyl- 4-piperidyl group.

3. The method according to claim 2, wherein the N-position of the 2,2,6,6-tetramethyl-4-piperidyl group has no substituent or a substituent selected from the group consisting of a $C_1$–$C_3$ alkyl group, an octyloxy group and a cyclohexyloxy group.

4. The method according to claim 1, wherein $R^1$ is a methyl group.

5. The method according to claim 1, wherein $R^2$ is selected from the group consisting of hydrogen, a $C_1$–$C_3$ alkyl group, octyloxy group, a cyclohexyloxy group and a hydroxyl group.

6. The method according to claim 1, wherein n is 6.

7. The method according to claim 1, wherein $R^1$ is selected from the group consisting of a methyl group, an N-unsubstituted 2,2,6,6-tetramethyl-4-piperidyl group, a 1,2,2,6,6-pentamethyl-4-piperidyl group, a 2,2,6,6-tetramethyl-1-octyloxy-4-piperidyl group and a 1-cyclohexyloxy-2,2,6,6-tetramethyl-4-piperidyl group, $R^2$ is selected from the group consisting of a hydrogen atom, a $C_1$–$C_3$ alkyl group, an octyloxy group, a cyclohexyloxy group and a hydroxyl group, and n is 6.

8. The method according to claim 1, wherein the organic material is selected from the group consisting of synthetic resins, rubbers, paints and oils.

9. The method according to claim 1, wherein the hindered piperidine is blended with the organic material in an amount of about 0.02 to about 2 parts by weight based on 100 parts by weight of the organic material.

10. The method according to claim 2, wherein the N-position of the 2,2,6,6-tetramethyl-4-piperidyl group has a substituent selected from the group consisting of a $C_1$–$C_{10}$ alkyl group, a $C_1$–$C_{18}$ alkoxy group and a hydroxyl group.

11. The method according to claim 10, wherein the substituent on the N-position of the 2,2,6,6-tetramethyl-4-piperidyl group is a $C_1$–$C_{10}$ alkyl group.

12. The method according to claim 10, wherein the substituent on the N-position of the 2,2,6,6-tetramethyl-4-piperidyl group is a $C_1$–$C_{18}$ alkoxy group.

13. The method according to claim 1, wherein $R^1$ is a $C_1$–$C_{18}$ alkyl group.

14. The method according to claim 1, wherein $R^2$ is a $C_1$–$C_{10}$ alkyl group.

15. The method according to claim 1, wherein $R^2$ is a $C_1$–$C_{18}$ alkyloxy group.

16. The method according to claim 11, wherein the $C_1$–$C_{10}$ alkyl group substituent on the N-position of the 2,2,6,6-tetramethyl-4-piperidyl group contains a cyclic alkyl group located at a middle or terminal position of the $C_1$–$C_{10}$ alkyl group, the cyclic alkyl group being bonded to the N-position through one or two —$CH_2$— groups.

17. The method according to claim 11, wherein the $C_1$–$C_{10}$ alkyl group substituent on the N-position of the 2,2,6,6-tetramethyl-4-piperidyl group is a cyclohexylmethyl group or a cyclohexylethyl group.

18. The method according to claim 12, wherein the $C_1$–$C_{18}$ alkoxy group substituent on the N-position of the 2,2,6,6-tetramethyl- 4-piperidyl group is a cyclic alkoxy group.

19. The method according to claim 12, wherein the $C_1$–$C_{18}$ alkoxy group substituent on the N-position of the 2,2,6,6-tetramethyl- 4-piperidyl group is a cyclohexyloxy group.

20. The method according to claim 13, wherein the $C_1$–$C_{18}$ alkyl group is a cyclic alkyl group.

21. The method according to claim 20, wherein the cyclic alkyl group is a cyclohexyl group.

22. The method according to claim 21, wherein the $C_1$–$C_{10}$ alkyl group contains a cyclic alkyl group located at a middle or terminal portion of the $C_1$–$C_{10}$ alkyl group, the cyclic alkyl group being bonded to the hindered piperidine compound through one or two —$CH_2$— groups.

23. The method according to claim 14, wherein the $C_1$–$C_{10}$ alkyl group is a cyclohexylmethyl group or a cyclohexylethyl group.

24. The method according to claim 15, wherein the $C_1$–$C_{18}$ alkyloxy group is a cyclic alkoxy group.

25. The method according to claim 15, wherein the $C_1$–$C_{18}$ alkyloxy group is a cyclohexyloxy group.

26. The method according to claim 1, wherein the $C_7$–$C_{18}$ arylalkyl group is a benzyl group or a phenethyl group.

27. The method according to claim 1, wherein the hindered piperidine compound is N,N'-bis(2-methoxycarbonyl-ethyl)-N,N'-bis( 2,2,6,6-tetramethyl-4-piperidyl)-1,6-hexanediamine.

28. The method according to claim 1, wherein the hindered piperidine compound is N,N'-bis[2-(2,2,6,6-tetramethyl-4-piperidyloxycarbonyl)ethyl] -N,N'-bis(2,2,6,6-tetramethyl-4-piperidyl)- 1,6-hexanediamine.

29. The method according to claim 1, wherein the hindered piperidine compound is N N'-bis(2-methoxycarbonylethyl)-N,N'-bis( 1,2,2,6,6-pentamethyl-4-piperidyl)-1,6-hexanediamine.

30. The method according to claim 1, wherein $R^1$ is selected from the group consisting of 2,2,6,6-tetramethyl-4-piperidyl, 1,2,2,6,6-pentamethyl-4-piperidyl,2,2,6,6-tetramethyl-1-octyloxy- 4-piperidyl, 1-cyclohexyloxy-2,2,6,6-tetramethyl-4-piperidyl, 1-hydroxy- 2,2,6,6-tetramethyl-4-piperidyl, hydrogen, methyl, ethyl and 2-ethylhexyl.

31. The method according to claim 1, wherein $R^1$ is selected from the group consisting of 2,2,6,6-tetramethyl-4-piperidyl, 1,2,2,6,6-pentamethyl-4-piperidy1,2,2,6,6-tetramethyl-1-octyloxy- 4-piperidyl, 1-cyclohexyloxy-2,2,6,6-tetramethyl-4-piperidyl, 1-hydroxy- 2,2,6,6-tetramethyl-4-piperidyl, hydrogen, methyl, ethyl and 2-ethylhexyl, $R^2$ is selected from the group consisting of a hydrogen atom, a $C_1$–$C_3$ alkyl group, an octyloxy group, a cyclohexyloxy group and a hydroxyl group, and n is 6.

32. The method according to claim 1, wherein $R_1$ is a methyl group or a 2,2,6,6-tetramethyl-4-piperidyl group.

33. The method according to claim 1, wherein $R_2$ is a hydrogen atom or a methyl group.

34. The method according to claim 6, wherein $R_1$ is a methyl group or a 2,2,6,6-tetramethyl-4-piperidyl group and $R_2$ is a hydrogen atom or a methyl group.

* * * * *